(12) United States Patent
Tveide et al.

(10) Patent No.: US 7,450,467 B2
(45) Date of Patent: Nov. 11, 2008

(54) APPARATUS AND METHODS FOR SEISMIC STREAMER POSITIONING

(75) Inventors: Tallak Tveide, Kristiansand (NO); Leendert Combee, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 11/386,003

(22) Filed: Mar. 21, 2006

(65) Prior Publication Data

US 2006/0227657 A1 Oct. 12, 2006

Related U.S. Application Data

(60) Provisional application No. 60/669,534, filed on Apr. 8, 2005.

(51) Int. Cl.
*G01V 1/38* (2006.01)

(52) U.S. Cl. .......................................... 367/16; 114/245

(58) Field of Classification Search ................... 367/16, 367/20; 702/14; 114/244, 245
See application file for complete search history.

(56) References Cited

U.S. PATENT DOCUMENTS

| | | | |
|---|---|---|---|
| 3,375,800 A | 4/1968 | Cole et al. ................... 114/235 |
| 3,412,705 A | 11/1968 | Nesson .......................... 115/12 |
| 3,434,446 A | 3/1969 | Cole ............................. 114/235 |
| 3,440,992 A | 4/1969 | Chance ........................ 114/235 |
| 3,560,912 A | 2/1971 | Spink et al. ..................... 340/3 |
| 3,605,674 A | 9/1971 | Weese ..................... 114/235 B |
| 3,648,642 A | 3/1972 | Fetrow et al. ................ 114/235 |
| 3,774,570 A | 11/1973 | Pearson ................... 114/235 B |
| 3,896,756 A | 7/1975 | Pearson et al. ........... 114/235 B |
| 3,931,608 A | 1/1976 | Cole .............................. 367/17 |
| 3,943,483 A | 3/1976 | Strange .................... 340/7 PC |
| 3,961,303 A | 6/1976 | Paitson ......................... 367/17 |
| 4,027,616 A * | 6/1977 | Guenther et al. ............. 114/244 |
| 4,033,278 A | 7/1977 | Waters ........................ 114/245 |
| 4,063,213 A | 12/1977 | Itria et al. ....................... 367/17 |
| 4,087,780 A | 5/1978 | Itria et al. ....................... 367/17 |

(Continued)

FOREIGN PATENT DOCUMENTS

AU 199853305 12/1997

(Continued)

OTHER PUBLICATIONS

UK Search Report dated Jul. 10, 2006, Application No. GB 0606781.3.

*Primary Examiner*—Mark Hellner
(74) *Attorney, Agent, or Firm*—Dan C. Hu; Liangang (Mark) Ye; Jeffrey E. Griffin

(57) ABSTRACT

Systems and methods for positioning seismic streamers are disclosed that enable two or more streamers to be positioned in over/under configuration. One system comprises first and second pluralities of remotely controllable birds mounted on or inline in first and second streamers, the birds functioning to control position of the streamers relative to each other, to another pair of streamers, or to some reference. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 CFR 1.72(b).

20 Claims, 7 Drawing Sheets

U.S. PATENT DOCUMENTS

| | | | |
|---|---|---|---|
| 4,222,340 A | 9/1980 | Cole | 114/245 |
| 4,227,479 A | 10/1980 | Gertler et al. | 114/312 |
| 4,290,124 A | 9/1981 | Cole | 367/18 |
| 4,313,392 A | 2/1982 | Guenther et al. | 114/244 |
| 4,323,989 A | 4/1982 | Huckabee et al. | 367/17 |
| 4,404,664 A | 9/1983 | Zachariadis | 367/19 |
| 4,463,701 A | 8/1984 | Pickett et al. | 114/245 |
| 4,484,534 A | 11/1984 | Thillaye du Boullay | 114/244 |
| 4,694,435 A | 9/1987 | Magneville | 367/17 |
| 4,709,355 A | 11/1987 | Woods et al. | 367/16 |
| 4,711,194 A | 12/1987 | Fowler | 114/245 |
| 4,723,501 A | 2/1988 | Hovden et al. | 114/144 B |
| 4,729,333 A | 3/1988 | Kirby et al. | 114/244 |
| 4,745,583 A | 5/1988 | Motal | 367/18 |
| 4,766,441 A | 8/1988 | Phillips et al. | 343/709 |
| 4,767,183 A | 8/1988 | Martin | 350/96.23 |
| 4,843,996 A | 7/1989 | Darche | 114/245 |
| 4,890,568 A * | 1/1990 | Dolengowski | 114/246 |
| 4,890,569 A | 1/1990 | Givens | 114/349 |
| 4,912,684 A | 3/1990 | Fowler | 367/76 |
| 4,992,990 A | 2/1991 | Langeland et al. | 367/19 |
| 5,042,413 A | 8/1991 | Benoit | 114/244 |
| 5,052,814 A | 10/1991 | Stubblefield | 367/15 |
| 5,148,406 A * | 9/1992 | Brink et al. | 367/22 |
| 5,402,745 A | 4/1995 | Wood | 114/244 |
| 5,443,027 A | 8/1995 | Owsley et al. | 114/244 |
| 5,507,243 A | 4/1996 | Williams et al. | 114/244 |
| 5,517,202 A | 5/1996 | Patel et al. | 343/709 |
| 5,517,463 A | 5/1996 | Hornbostel et al. | 367/13 |
| 5,529,011 A | 6/1996 | Williams, Jr. | 114/245 |
| 5,532,975 A | 7/1996 | Elholm | 367/16 |
| 5,619,474 A | 4/1997 | Kuche | 367/17 |
| 5,642,330 A | 6/1997 | Santopietro | 367/131 |
| 5,790,472 A | 8/1998 | Workman et al. | 367/19 |
| 6,011,752 A * | 1/2000 | Ambs et al. | 367/17 |
| 6,011,753 A | 1/2000 | Chien | 367/21 |
| 6,016,286 A | 1/2000 | Olivier et al. | 367/17 |
| 6,144,342 A | 11/2000 | Bertheas et al. | 343/709 |
| 6,459,653 B1 | 10/2002 | Kuche | 367/17 |
| 6,525,992 B1 | 2/2003 | Olivier et al. | 367/17 |
| 6,549,653 B1 | 4/2003 | Osawa et al. | 382/162 |
| 6,671,223 B2 | 12/2003 | Bittleston | 367/19 |
| 6,691,038 B2 * | 2/2004 | Zajac | 702/14 |
| 6,775,618 B1 * | 8/2004 | Robertsson et al. | 702/14 |
| 6,879,542 B2 | 4/2005 | Soreau et al. | 367/17 |
| 7,080,607 B2 * | 7/2006 | Hillesund et al. | 114/244 |
| 7,190,634 B2 * | 3/2007 | Lambert et al. | 367/128 |

FOREIGN PATENT DOCUMENTS

| | | |
|---|---|---|
| AU | 734810 B | 6/2001 |
| CA | 2270719 | 12/1997 |
| DE | 69702673 T | 4/2001 |
| EP | 0193215 | 1/1986 |
| EP | 0319716 | 6/1989 |
| EP | 0321705 | 6/1989 |
| EP | 0525391 | 2/1993 |
| EP | 0390987 | 12/1993 |
| EP | 0581441 | 8/1997 |
| EP | 0909701 | 1/2003 |
| GB | 2093610 | 9/1982 |
| GB | 2122562 | 1/1984 |
| GB | 2331971 | 6/1999 |
| GB | 2342081 | 4/2000 |
| NO | 992701 | 6/1999 |
| WO | WO95/31735 | 11/1995 |
| WO | WO96/21163 | 7/1996 |
| WO | WO97/11395 | 3/1997 |
| WO | WO97/30361 | 8/1997 |
| WO | WO97/45006 | 12/1997 |
| WO | WO98/28636 | 7/1998 |
| WO | WO99/04293 | 1/1999 |
| WO | WO 2005/111656 | 11/2005 |

\* cited by examiner

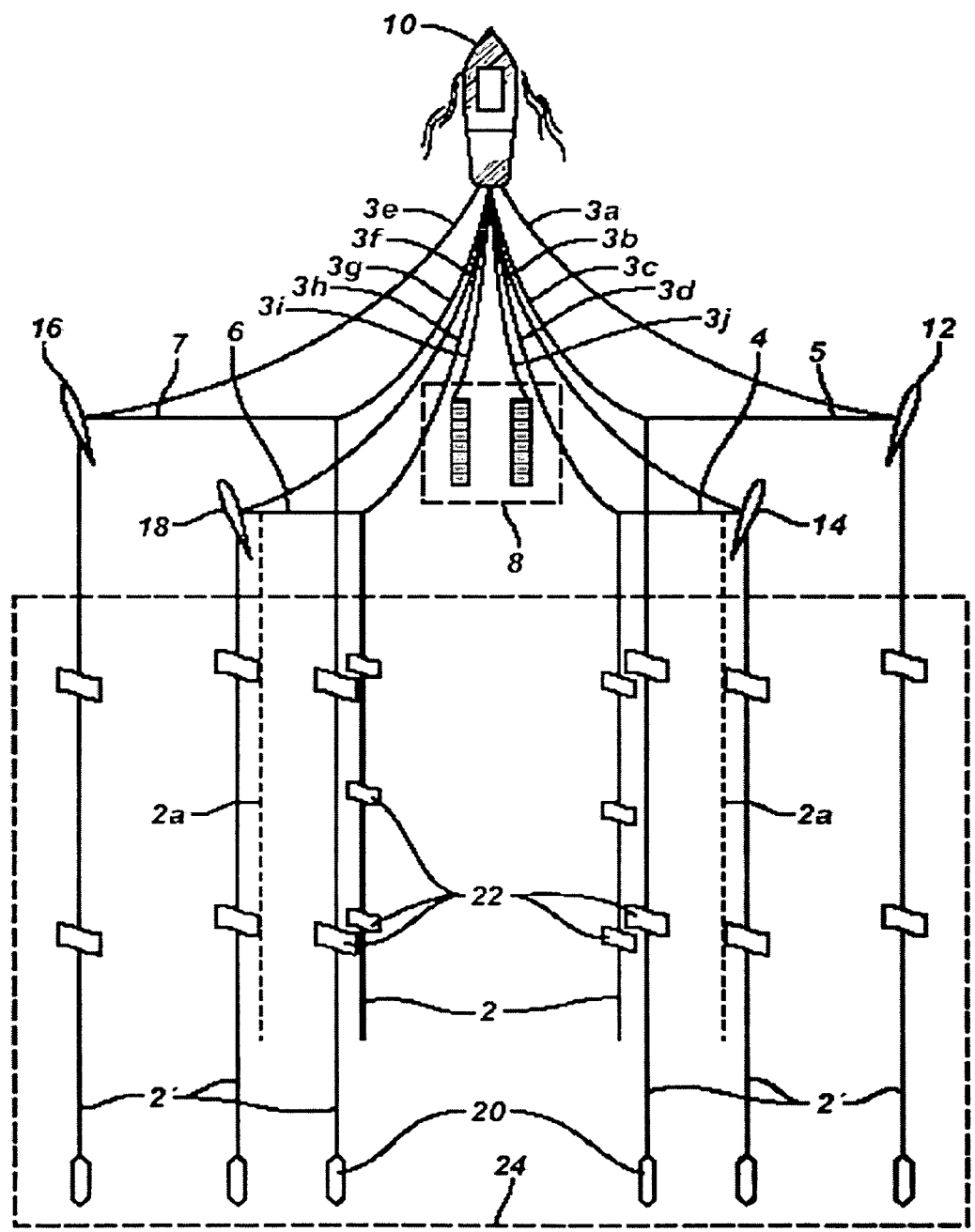

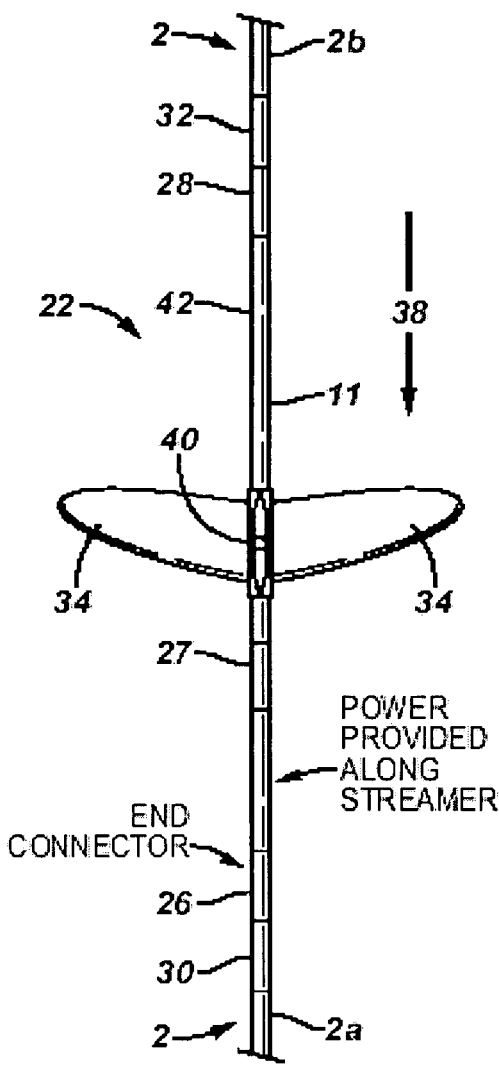
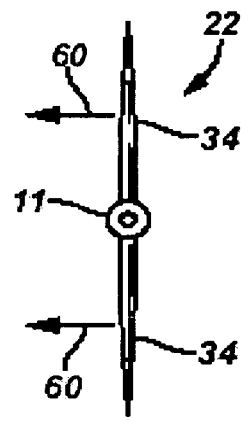
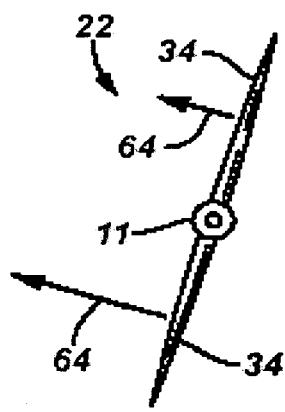
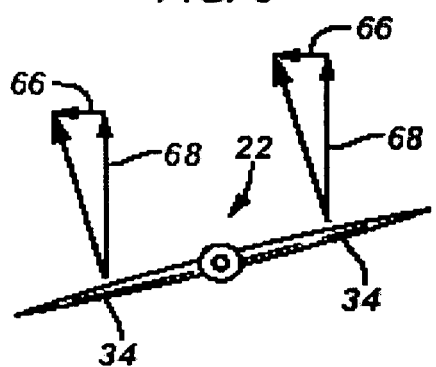

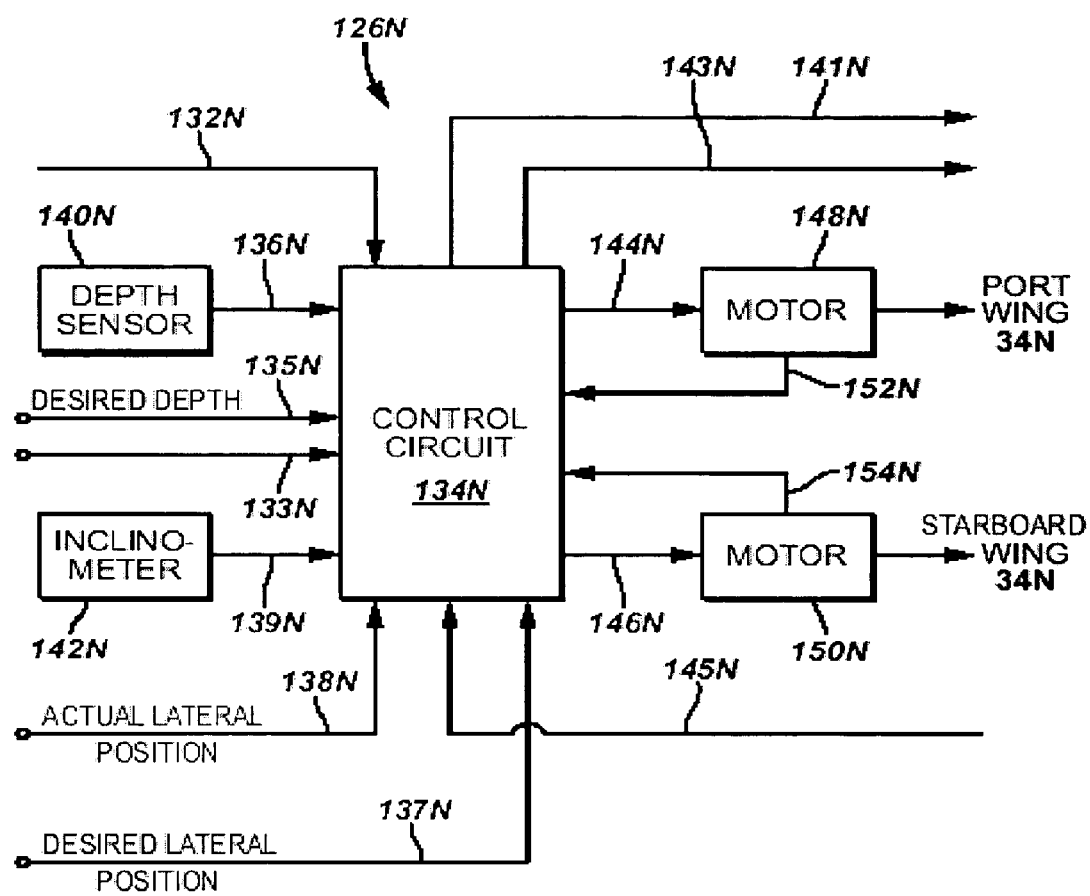

FIG. 7A
FIG. 7B
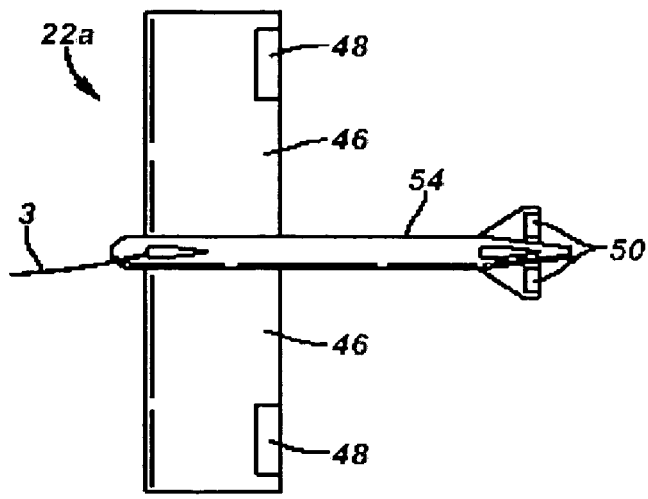
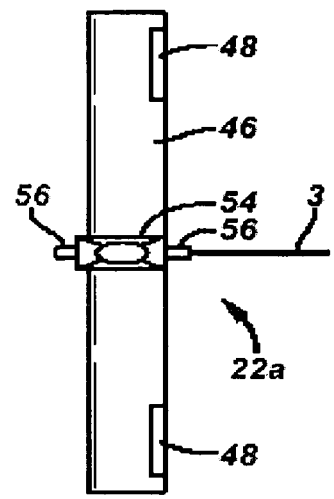
FIG. 7C
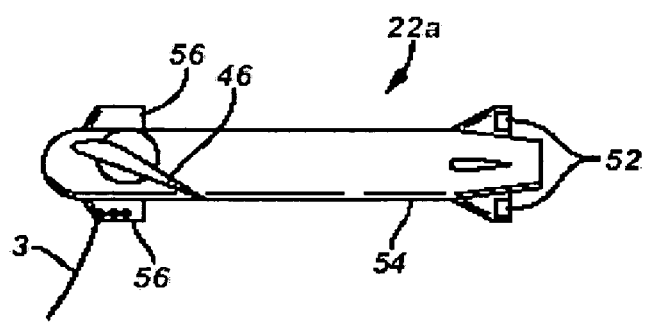
FIG. 8
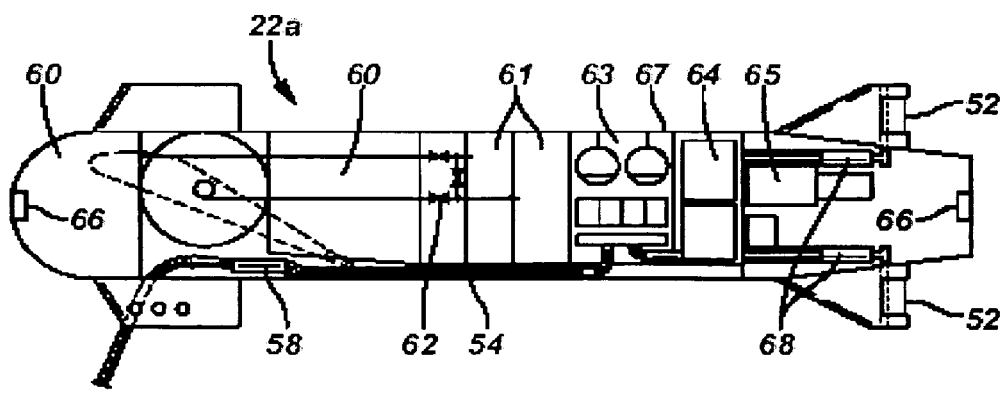

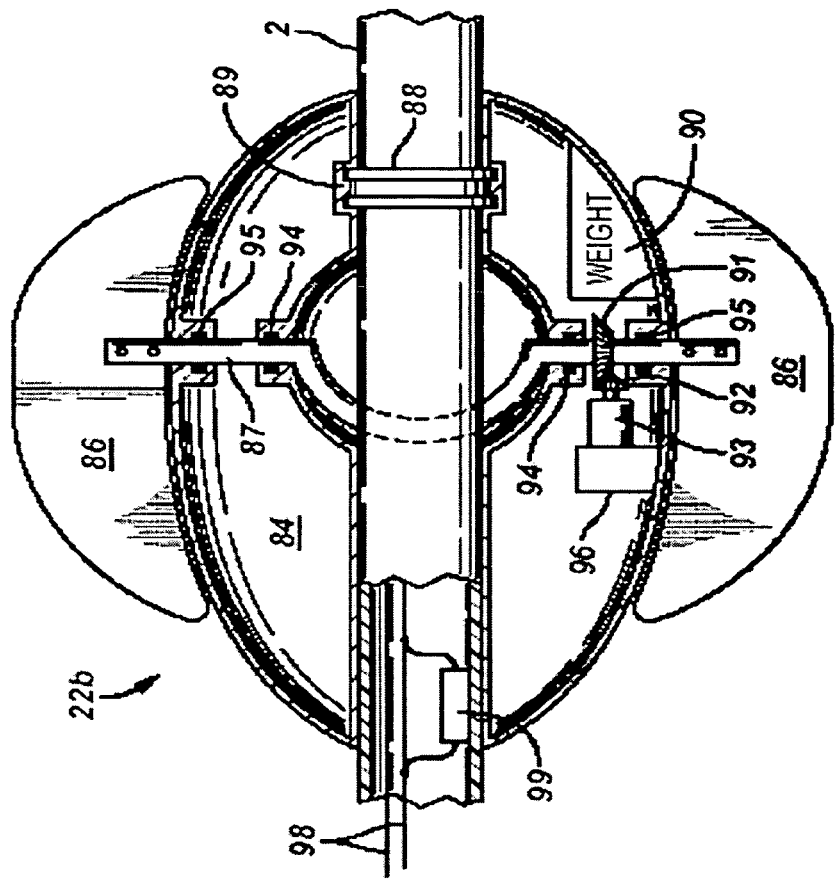
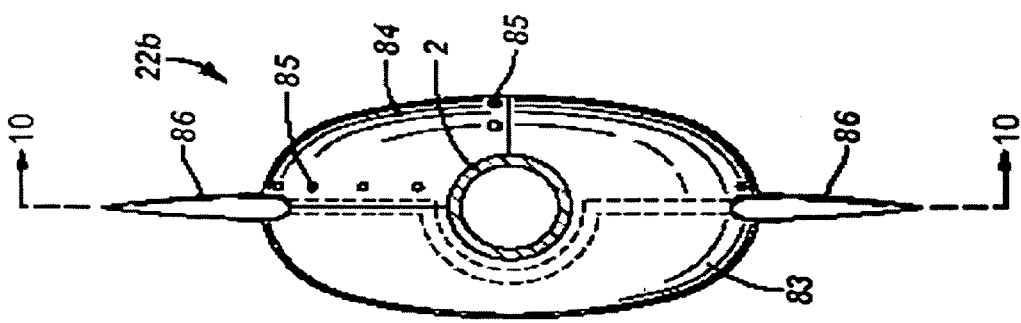

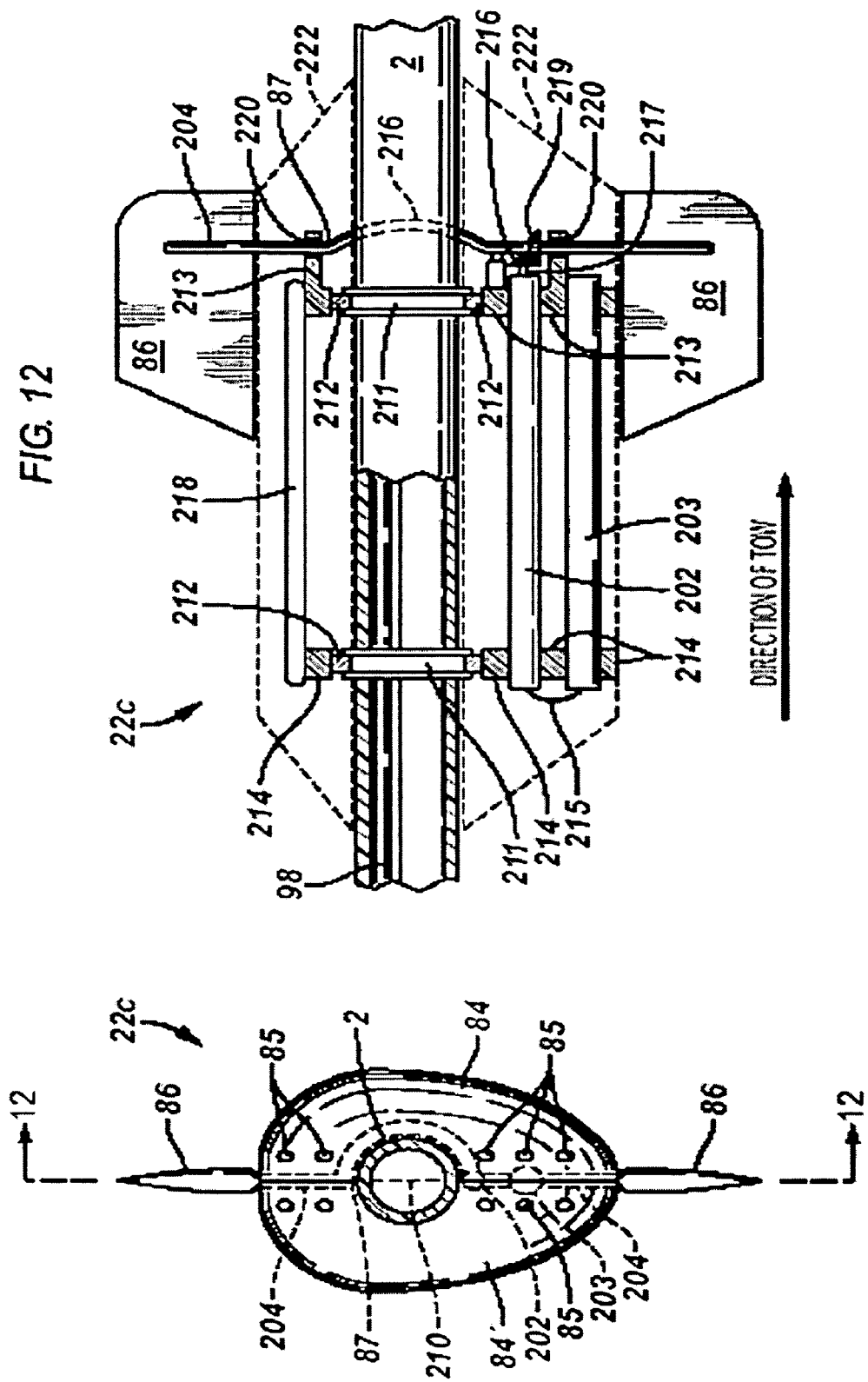

APPARATUS AND METHODS FOR SEISMIC STREAMER POSITIONING

CROSS-REFERENCE TO RELATED APPLICATIONS

The present application claims priority under 35 U.S.C. § 119(e) to U.S. Provisional Application Ser. No. 60/669,534, filed Apr. 8, 2005, incorporated by reference herein in its entirety.

BACKGROUND OF THE INVENTION

1. Field of Invention

The present invention relates to the field of marine seismic instrumentation and methods of using same. More specifically, the invention relates to apparatus and methods for improving seismic images obtained using seismic instrumentation, as well as related systems, methods, and devices.

2. Related Art

Marine seismic exploration investigates and maps the structure and character of subsurface geological formations underlying a body of water. For large survey areas, seismic vessels tow one or more seismic sources and multiple seismic streamer cables through the water. The seismic sources typically comprise compressed air guns for generating acoustic pulses in the water. The energy from these pulses propagates downwardly into the geological formations and is reflected upwardly from the interfaces between subsurface geological formations. The reflected energy, along with ghost signals from other surfaces, are sensed with hydrophones attached to the seismic streamers, and data representing such energy is recorded and processed to provide information about the underlying geological features. Ghosting may be reduced by controlling position of the streamers. The streamers may be positioned using steerable birds, deflectors, steerable buoys, and the like.

Previous attempts have not provided optimal de-ghosting of marine seismic images. While these techniques are improvements in the art, further improvement is desired.

SUMMARY OF THE INVENTION

In accordance with the present invention, systems and methods are described for controlling position of at least portions of seismic streamers in over/under configuration, referring to a cross-section of the streamer geometry in a vertical plane. The systems and methods of the invention reduce or overcome problems with previous systems and methods in de-ghosting data. Systems and methods of the invention may be used to collect data reduced in ghost signals, or that can be de-ghosted. Other uses include using the vertical sampling data obtained to calculate a spatial derivative of data with respect to z (vertical). In-line data sampling provides the spatial derivative with respect to x (along the streamer). These spatial derivatives may be used to derive, using the equations that describe the physics of wave motion, the spatial derivative with respect to the y (cross-line direction). This in turn may be used to predict the seismic wavefield away from a streamer in the horizontal plane.

A first aspect of the invention is a system comprising:
(a) a first seismic streamer having a first portion at a first vertical position and having a first orientation member;
(b) a second seismic streamer having a second portion at a second vertical position different from the first vertical position and having a second orientation member;
(c) the orientation members functioning to control vertical and horizontal position of at least the first and second portions in over/under configuration.

It will be understood that certain system embodiments may have more than two streamers in over/under configuration, as that term is defined herein. It will also be understood that certain system embodiments may have streamers that are not in over/under configuration, in other words, two or more streamers may be over/under configuration, and one or more streamers may be positioned laterally away from the over/under streamers in the cross-line (y) direction, or (z) direction. Furthermore, each streamer may have more than one orientation member associated therewith. For simplicity only, we discuss two streamers in over/under configuration (as defined herein), each having at least one orientation member. One or both of the first and second orientation members may be remotely controlled, and each may be a remotely controllable bird. The first and second orientation members may both control vertical and horizontal position of their respective streamers, or the first and second orientation members may each be comprised of a combination of two or more orientation members, one in the combination controlling vertical position, and a second in the combination controlling horizontal position. Systems of the invention include versions wherein a first plurality of orientation members are operatively connected to the first streamer, and a second plurality of orientation members are operatively connected to the second streamer. The first plurality of orientation members may be substantially equally spaced along the length of the first streamer. The second plurality of orientation members may be substantially equally spaced along the length of the second streamer. Other portions of the streamers may be offset horizontally from over/under configuration, either curved or in straight line position. Alternatively, the entire lengths of the first and second streamers may be positioned in over/under arrangement.

Another aspect of the invention comprises methods of controlling orientation of a pair of seismic streamers in over/under configuration, one method comprising:
(a) releasably attaching a first orientation member to a first seismic streamer and a second orientation member to a second seismic streamer, the first seismic streamer having a first portion at a first vertical position, the second seismic streamer having a second portion at a second vertical position different from the first vertical position; and
(b) adjusting the orientation members to control vertical and horizontal position of at least the first and second portions in over/under configuration.

As with the systems of the invention, methods of the invention are not limited in the number of streamers whose positions are controlled in over/under configuration, nor is there any limit to the number of orientation members on any streamer. Further, one or more streamers may be controlled to be laterally spaced in the cross-line direction away from streamers being positioned in over/under configuration. Methods of the invention may comprise wherein the adjusting is performed by communicating with one or both orientation members. Communicating with the orientation members may be performed by telemetry selected from hard wire, wireless, and optical telemetry. Other methods of the invention comprise adjusting one or more of the orientation members to move the pair of seismic streamers to a desired position, which may be any direction in 3-dimensions, for example lateral (horizontal), vertical, or any direction in between these extremes. The desired position may be relative to another pair of streamers, or to a natural reference such as the water surface, water bottom, or a geologic feature, or a man-made reference, such as a buoy, vessel, drilling rig, production rig, or the like. The other pair of streamers may employ systems of the invention.

Systems and methods of the invention will become more apparent upon review of the brief description of the drawings, the detailed description of the invention, and the claims which follow.

BRIEF DESCRIPTION OF THE DRAWINGS

The manner in which the objectives of the invention and other desirable characteristics can be obtained is explained in the following description and attached drawings in which:

FIGS. 1A and 1B illustrate two of many towing arrangements employing systems and methods of the invention;

FIG. 2 is a schematic representation of an orientation member useful in the present invention;

FIG. 3 illustrates a control scheme that may be utilized to control orientation members in systems of the invention;

FIGS. 4 to 6 illustrate the operation of the orientation member of FIG. 2;

FIG. 7A is a principle or side view of another orientation member useful in the invention;

FIG. 7B is a front view of the device of FIG. 7A;

FIG. 7C illustrates the device of FIGS. 7A and 7B viewed from above;

FIG. 8 illustrates the orientation member of FIGS. 7A-7C viewed from above, and with a view of how the member looks inside;

FIG. 9 is a front view of another orientation member useful in the invention;

FIG. 10 is a section view of the orientation member of FIG. 9 along section lines 10-10 of FIG. 9;

FIG. 11 is a front view of another orientation member useful in the present invention; and FIG. 12 is a section view of the orientation member of FIG. 11 along section lines 11-11 of FIG. 11.

Figure 1A:
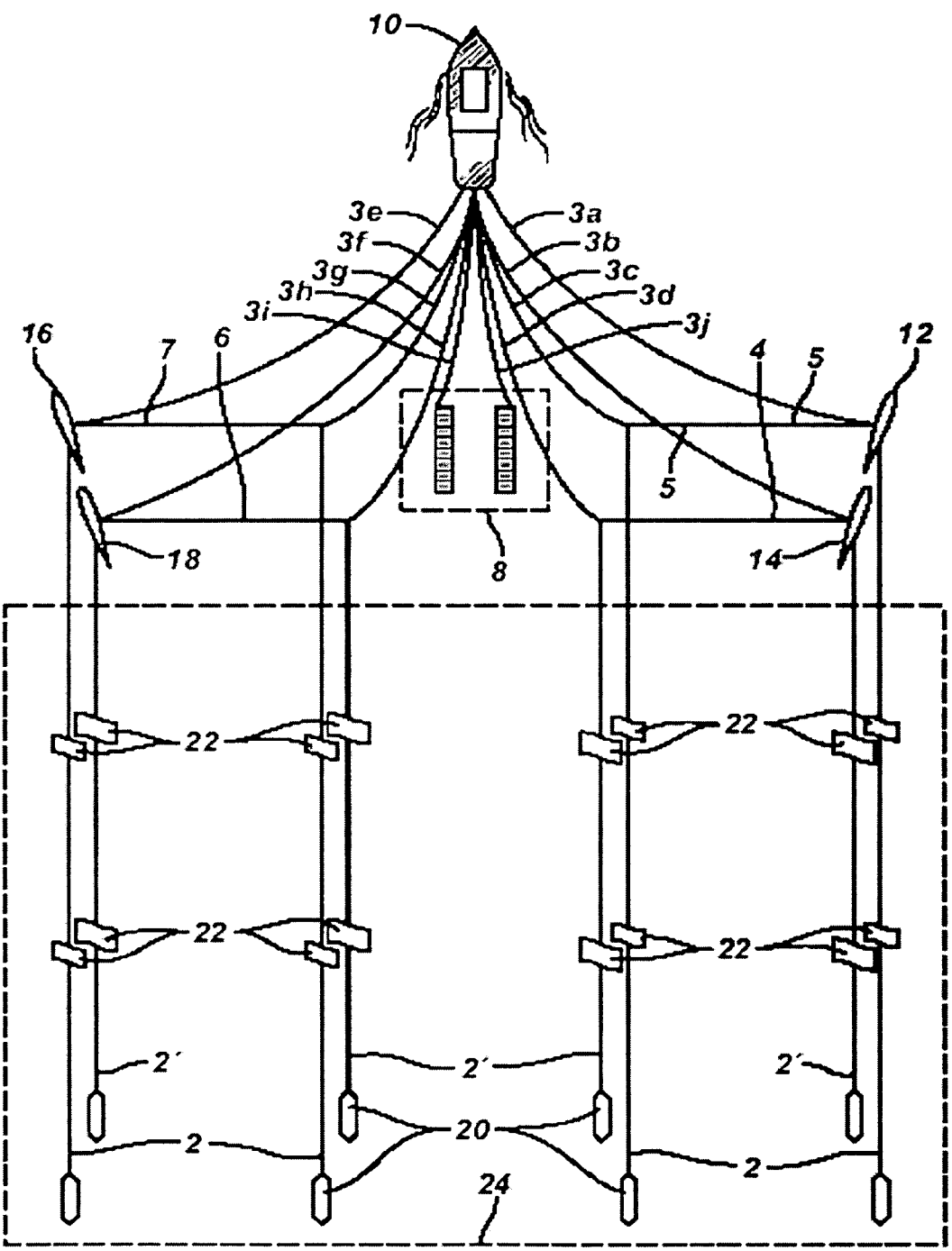

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, in the discussion herein, aspects of the invention are developed within the general context of controlled positioning of seismic streamers, which may employ computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced in whole or in part with other computer system configurations, including hand-held devices, personal digital assistants, multiprocessor systems, microprocessor-based or programmable electronics, network PCs, minicomputers, mainframe computers, and the like. In a distributed computer environment, program modules may be located in both local and remote memory storage devices. It is noted, however, that modification to the systems and methods described herein may well be made without deviating from the scope of the present invention. Moreover, although developed within the context of controlling position of seismic streamers, those skilled in the art will appreciate, from the discussion to follow, that the principles of the invention may well be applied to other aspects of seismic data acquisition. Thus, the systems and method described below are but illustrative implementations of a broader inventive concept.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention relates to various systems and methods for controlling vertical and horizontal position of one or more marine seismic components. Systems and methods of the invention may be used in any form of marine seismology, including, but not limited to, 2-D, 3-D, and 4-D seismology. One aspect of the present invention relates to systems for positioning seismic streamers, a combination of two streamers, not connected, but positioned controlled using an orientation member on each streamer. Other aspects of the present invention, which are further explained below, relate to methods for remotely controlling vertical and horizontal position of marine seismic streamers.

As used herein the phrases "over/under configuration" and "over/under configured" means, when viewing a cross-section of the streamer geometry in a vertical plane, a streamer is directly above and/or below one or more other streamer or unlimited number of streamers. The over/under configuration may be for only selected cross-sections in selected vertical planes, or for all vertical planes along the length of any particular streamer.

The phrase "orientation member" means a device capable of movements that may result in any one or multiple straight line or curved path movements of a streamer in 3-dimensions, such as lateral (horizontal), vertical up, vertical down, and combinations thereof. The terms and phrases "bird", "cable controller", "streamer control device", and like terms and phrases are used interchangeably herein and refer to orientation members having one or more control surfaces attached thereto or a part thereof. A "steerable front-end deflector" (or simply "deflector") such as typically positioned at the front end of the outer-most streamer, and other deflecting members, such as those that may be employed at the front end of seismic sources or source arrays, may function as orientation members in some embodiments, although they are primarily used to pull streamers and steer sources laterally with respect to direction of movement of a tow vessel.

The phrases "control vertical and horizontal position", "controlling vertical and horizontal position", "position controllable", "remotely controlling position" and the term "steering" are generally used interchangeably herein, although it will be recognized by those of ordinary skill in the art that "steering" usually refers to following a defined path, while "control vertical and horizontal position", "controlling vertical and horizontal position", "position controllable", and "remotely controlling position" could mean steering, but also include maintaining a relative position, for example, one streamer relative to a second or a third streamer, or any number of streamers relative to one or more reference points, such as natural or man-made objects, or merely deflecting an object, or steering a group of streamers towards an aimpoint defined by themselves, e.g., all streamers steered toward their common mean position. These phrases also include controlling position so that the streamers form a "V" or "W", or some other pattern, referring to a cross-section of the streamer geometry in a vertical plane. As "control vertical and horizontal position", "position controllable" and "controlling vertical and horizontal position" are somewhat broader terms than "steering", these terms are used herein, except when specific instances demand using more specific words.

The term "position", when used as a noun, is broader than "depth" or lateral movement alone, and is intended to be synonymous with "spatial relation." Thus "vertical position" includes depth, but also distance from the seabed or distance above or below a submerged or semi-submerged object, or an object having portions submerged. When used as a verb, "position" means cause to be in a desired place, state, or spatial relation.

The term "control", used as a transitive verb, means to verify or regulate by comparing with a standard or desired value, and when used as a noun ("controller") means a mechanism that controls. Control may be open-loop, closed loop, feedback, feed-forward, cascade, adaptive, heuristic and combinations thereof.

The phrase "functioning to control vertical and horizontal position", when referring to two or more orientation members, means functioning independently or interdependently to control vertical and horizontal position of streamers to which they are attached.

The term "adjusting" means changing one or more parameters or characteristics in real-time or near-real-time. "Real-time" means dataflow that occurs without any delay added beyond the minimum required for generation of the dataflow components. It implies that there is no major gap between the storage of information in the dataflow and the retrieval of that information. There may be a further requirement that the dataflow components are generated sufficiently rapidly to allow control decisions using them to be made sufficiently early to be effective. "Near-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after they are received by the next process in the decision line.

Over/under configuration towing may improve the seismic image considerably as one may be able to separate the downward propagating acoustic wave field from the upward propagating wave field. Among geophysicists this is called de-ghosting. Cross-line data interpolation, and prediction of the seismic wavefield away from a streamer in a horizontal plane including the streamer, may also be performed. By towing two or more sets of over/under configured streamers, for example towing two or more sets of streamers, each set in over/under configuration with lateral spacing there between, it is possible to form an array so as to cover a rectangle. FIGS. 1A and 1B illustrate two towing arrangements employing systems and methods of the invention. Many variations are possible, and it should be emphasized again that the systems and methods of the invention are not limited to the specific embodiments illustrated and discussed herein. A seismic vessel 10 is shown towing an array 24 of seismic hydrophones (not shown) hidden within streamers 2, 2'. The number of streamer pairs may exceed ten, but four to eight will probably be common. An example of a four-streamer pair configuration is shown in FIG. 1A, wherein each streamer pair 2, 2' comprises one streamer 2' placed as accurate as possible on top of the other streamer 2 in over/under arrangement the entire length of each streamer. FIG. 1B illustrates an embodiment wherein only a portion of two streamer pairs 2, 2' is in over/under configuration, and wherein the other streamers may be in the same plane, or in a "W" or "V" cross-line pattern, as further explained herein. Also, streamers 2 are illustrated as shorter than streamers 2', although they may be the same length as streamers 2'. A seismic source 8 towed by source tow members 3i and 3j (only two source tow members are shown for clarity) provides a pressure pulse that is reflected in the sub surface layers of the sea bottom and recorded by the seismic hydrophones. This signal is used to map the geological structure beneath the sea floor. In FIGS. 1A and 1B streamers 2 are towed deeper than streamers 2'.

Referring again to FIGS. 1A and 1B, streamers 2 and 2' may be deflected laterally by seismic deflectors 12, 14, 16, and 18, which may be passive or remotely controllable, and to the extent that they help position the streamers at least laterally, may also fall into the category of orientation members. Eight streamers 2 and 2' are illustrated in both FIGS. 1A and 1B towed by respective eight tow members 3a-3h as indicated, with separation members 4, 5, 6, and 7 provided between adjacent deep streamers 2 and adjacent shallow streamers 2'. Passive or active tow members (not shown) may connect source 8 with one or more streamer tow members. The vertical distance between streamers 2, 2' in a streamer pair may range from 1 meter to 50 meters, and may be about 5 meters. A selected number of hydrophones, either mounted within the streamer or in/on equipment mounted onto the streamer, may be used as receivers in an acoustic ranging system and thereby provide knowledge of the horizontal and vertical position of streamers 2 and 2'. Horizontal separation between individual streamers may range from 0 (for example in the embodiment illustrated in FIG. 1A, exclusively over/under configuration) to about 200 meters when portions of streamers are not configured in over/under arrangement, as in the embodiment illustrated in FIG. 1B. When discussing streamers in over/under configuration, such as in FIG. 1A, the horizontal separation between adjacent pairs may range from near 0 to about 200 meters, however, as the horizontal separation approaches zero, relative cost and risk of loss and/or entanglement of streamers become greater. In the embodiment of FIG. 1B the horizontal streamer separation in those streamer portions not in over/under configuration may be consistent between one streamer 2 and its nearest neighboring streamers 2'.

Horizontal and vertical control of streamers 2 and 2' is provided by orientation members 22 which may be of any type as explained herein, such as small hydrofoils or birds that can provide forces in the vertical and horizontal planes. In FIGS. 1A and 1B, orientation members 22 on streamers 2' appear larger merely to reflect that they are closer to the surface of the water than orientation members 22 on streamers 2, since streamers 2 are towed deeper in these embodiments. Orientation members 22 may be equally spaced along the length of the streamers. Orientation members 22 may be clamped to streamers 2, 2', hung from streamers 2, 2', or inserted inline in streamers 2, 2' to provide the desired vertical and horizontal position control. Additional orientation members (not shown) may be placed at intervals between orientation members 22 for supplemental position control, for example to reduce streamer "sagging" between locations where orientation members 22 are located on streamers 2, 2'. In some embodiments of the invention it may be possible to change the streamer configuration during the seismic survey using orientation members 22, optionally assisted by a winching system or other arrangement to alter the length of cables 4 and 6. Alternatively, cables 4 and 6 may be loops and the ends of steamers 2 attached to loop cables 4 and 6. As one non-limiting example, the spread may initially be as illustrated with over/under configuration as shown between streamers 2 and 2', and then changed by moving short, deeper streamers 2 to be under adjacent shallow streamers 2', as indicated by the phantom lines 2a.

One type of orientation member useful in the invention is described in commonly assigned U.S. Pat. No. 6,671,223, describing a steerable bird known under the trade designation "Q-FIN", available from WesternGeco LLC, Houston, Tex., that is designed to be electrically and mechanically connected in series with a streamer. The orientation member, or "bird", illustrated in FIG. 2 generally at 22, may comprise an elongate streamlined body 11 adapted to be mechanically and electrically connected in series in a multi-section marine seismic streamer 2 or 2' of the kind which is towed by a seismic survey vessel and which is used, in conjunction with a seismic source also towed by the vessel, or towed by a separate vessel, to conduct seismic surveys, as briefly described hereinbefore. To permit such connection, each end of body 11 is provided with a respective mechanical and electrical connector, 26 and 28, these connectors being complementary to, and designed to interconnect with, streamer end connectors 30, 32, that are normally used to join together adjacent sections of a streamer. Bird 22 may be provided with two opposed control surfaces, or wings, 34, which may be molded from a fiber-reinforced plastics material, which project outwardly from body 11 and which are independently rotatable about a common axis extending substantially perpendicularly through the longitudinal axis of the body. Rotation of wings 34 may be effected under the control of a control system sealingly housed within body 11. Wings 34 may be generally rounded and swept back with respect to the direction of tow of streamers 2 and 2' (which direction is indicated by the arrow 38), in order to reduce the possibility of debris becoming hooked on them. To facilitate their rapid removal and reattachment, wings 34 may be secured to body 11 by a quick-release attachment, 40. As mentioned hereinbefore, streamer 2 includes hydrophones distributed along its length; it also includes control and conversion circuitry for converting the outputs of the hydrophones into digital data signals, longitudinally extending control and data lines for conducting control and data signals to and from the control and conversion circuitry, and electrical power supply lines for supplying electrical power from the vessel to the circuitry. All these lines are coupled together from streamer section 2a to streamer section 2b via respective corresponding lines 42 which extend through body 11 of bird 22 between connectors 26, 28. Additionally, a control system 27 is connected to receive control signals and electric power from respective ones of lines 42. The greater part of the length of body 11 of bird 22 is flexible, the only rigid parts being connectors 30, 32, and a short central section which houses the control system 27 and from which the wings 34 project. This central section, which is made of aluminum or titanium and has holes passing longitudinally there through for the passage of stress members, such as those known under the trade designation Kevlar, which bear the longitudinal loads on the body 11, is kept as short as possible, typically around 40 cm, so that once wings 34 have been detached from body 11, streamer 2 can be wound onto and unwound from the large drum used for storing the streamer, with body 11 still connected in the streamer. Quick-release attachment 40 permits the removal and attachment of wings 34 to be at least partly automated as streamer 2 is reeled in and out during the survey. One embodiment of this bird has two opposed wings that are independently controllable in order to control a streamer's lateral position as well as its depth. Other birds useful in the invention include battery-powered birds suspended beneath the lower streamer of a streamer pair and including a pair of laterally projecting wings, the combination of streamers, orientation members (birds) being arranged to be neutrally buoyant. Clamp-on birds, as discussed previously, may also be employed. Birds useful in the invention, including suspended birds, in-line birds, and clamp-on birds may include on-board controllers and/or communications devices, which may be microprocessor-based, to receive control signals representative of desired depth, actual depth, desired lateral position, actual lateral position and roll angle of the bird. The bird on-board controllers may communicate with local controllers mounted on or in other birds, and/or communicate with other local controllers and/or remote controllers, such as a supervisory controller. Such a control system is discussed in reference to FIG. 3. For example, the control schemes could be cascaded. Working independently of or with other birds, the bird control circuit may then adjust each of its wings independently by means of the stepper motors so as to start to achieve the calculated bird roll angle and wing angular positions. Although the primary function of the birds attached to each streamer is to function as orientation members to control relative position between streamers and/or steamer pairs, birds useful herein may include seismic receivers such as hydrophones, and in such instances may include an elongate, partly flexible body to house one or more receivers.

As mentioned hereinbefore, streamers 2 and 2' include hydrophones distributed along their length; they also may include control and conversion circuitry for converting the outputs of the hydrophones into digital data signals, longitudinally extending control and data lines for conducting control and data signals to and from the control and conversion circuitry, and electrical power supply lines for supplying electrical power from the vessel to the circuitry. All these lines may be coupled together from one streamer section to another streamer section via respective corresponding lines which extend through body 11 of steerable bird 22, through adjacent streamer sections, and through its nearest neighboring steerable bird 22, and so on down the length of the streamer. Alternatively or additionally, wireless and optical transmission signals may be generated and received by functional components in or on streamers 2 and 2' and steerable bird body 11. One reason for providing the elongate flexible parts of body 11 is to provide enough length for optional inclusion of one or more hydrophones or hydrophone groups, should this be necessary to preserve a desired uniform hydrophone spacing along the length of streamer 2 or 2'. If no hydrophones are included, the flexible parts of body 11 can be omitted altogether, along with the aforementioned stress members.

FIG. 3 is a schematic diagram of a control scheme useful in the invention for controlling orientation members in system and methods of the invention. In FIG. 3, "N" refers to the Nth orientation member, while N1, N2, and so on refer to an N1 orientation member, an N2 orientation member, and so forth. Control system 126N comprises a microprocessor-based control circuit 134N having respective inputs 135N to 139N to receive control signals representative of desired vertical position, actual vertical position, desired lateral position, actual lateral position and roll angle of orientation member N (for example, the angular position of body 11N in a plane perpendicular to the longitudinal axis of streamer 2 or 2'). Control circuit 134N may also receive information through input 133N regarding the status or position of orientation members N1, N2, and the like. The desired vertical position signal can be either a fixed signal or an adjustable signal, while the actual vertical position signal may be produced by a depth sensor 140N mounted in or on orientation member N. The lateral position signals may be derived from a position determining system of the kind described in our U.S. Pat. No. 4,992,990 or our International Patent Application No WO9621163. The roll angle signal may be produced by an inclinometer 142N mounted on or within orientation member N. Control circuit 134N may have control outputs 144N, 146N, connected to control respective electrical stepper motors 148N, 150N, each of which may be drivingly connected to a respective one of wings 34N. Stepper motors 148N, 150N may have respective outputs at which they produce signals representative of their respective current angular positions (and therefore of the current angular positions of wings 34N), which outputs may be connected to respective control inputs 152N, 154N of control circuit 134N.

FIGS. 4 to 6 illustrate the operation of bird 22 in the case where streamer 2 or 2' is slightly heavy (slightly negative buoyancy), and bird 22 thus needs to produce lift to maintain the streamer at the desired vertical position. This lift is produced by the flow of water over wings 34 of bird 22, resulting from the desired towing speed of streamers 2, 2' through the water, and can be changed by changing the angle of attack of the wings with respect to the flow. The magnitude of the lift required for moving streamer 2 is indicated by the length of arrows 60. If streamer 2 now needs to be moved laterally to the right (as viewed in FIGS. 4 to 6), the angular position of left wing 34 of bird 22 may be first adjusted to increase its lift, while the angular position of right wing 34 is adjusted to decrease its lift, as represented by the length of arrows 64 in FIG. 5, thus causing bird 22 to roll clockwise from the position shown in FIG. 4 to the position shown in FIG. 5. This clockwise roll may continue until bird 22 reaches a steady state condition shown in FIG. 6, where it can be seen that the vertical component of the lift produced by wings 34, indicated by arrows 66, is equal to the lift represented by arrows 60 of FIG. 4 required to maintain streamer 2 at the desired vertical position, while the much larger horizontal component, represented by arrows 68, moves streamer 2 to the right.

FIG. 7A illustrates a principle or side view of another orientation member 22a useful in the invention. Orientation member 22a is featured in assignee's U.S. Pat. No. 5,532,975, and the following discussion is derived from the 975 patent. Orientation member 22a comprises a body part 54, wings 46 with balance rudders 48 and tail rudders 50. FIG. 7B is a front view of the orientation member 22a, in which stabilizer rudders 56 are provided. In FIG. 7C rudders 56 are illustrated even more clearly. A view from above also provides a picture of two other tail rudders 52. Tow member 3 is the connection, which vessel 10 (FIG. 1) has with the towed equipment or with the ship.

FIG. 8 illustrates one possible internal design of orientation member 22a of FIGS. 7A-7C useful in the invention. FIG. 8 is one example of how a body of an orientation 22a member may be designed and arranged. The embodiment illustrated is not intended to be restricted to this form and layout, thus enabling orientation members of different type to be useful in the invention. In orientation member's forward and aft ends there may be provided acoustic positioning equipment 66. Instruments may be provided in a watertight compartment 63 for use in positioning orientation member 22a. The instruments that may be provided include an inclinometer, a compass, static pressure transmitters, pitot pressure transducers, and the like. In addition there may be transmitters that record angle deflection on wings and rudders. There may be a hydraulic system that operates the position of the adjustable parts of orientation member 22a. Common components for a hydraulic system such as pumps, oil, control valves, and the like may be located in a compartment 65. In the same compartment there may be provided cylinders 68 for the adjustment of tail rudders 52. A power supply may be partly transmitted from the towing cable directly to the electrical system, and/or batteries 64 may also be provided in a watertight compartment 67. The batteries may be located in orientation member 22a as a reserve and supplementary power supply. There may optionally be provided two sizeable ballast tanks or buoyancy tanks 60 in orientation member 22a. These may take in water as soon as orientation member 22a is placed in the water. If extra buoyancy is required, these tanks may be filled with air or other gas, such as nitrogen, helium, mixtures thereof, and the like. The air or other gas may be transported from a compressed gas reserve in a compartment 61 on board orientation member 22a via conduits to either the ballast tanks in the actual body part of 22a or to ballast or buoyancy tanks in the wings. A valve 62 may be provided between the gas supply to the wings and the gas supply to the reserve tanks in the body part of orientation member 22a. The wings may be moved by two parallel cylinders 58. Balance rudders 48 (FIG. 7A) may be regulated via separate cylinders located inside the wings, closest to the body. A shaft ensures that the force is transferred to balance rudders 48. Even though orientation member 22a may be steered mainly from the ship's 10 central control system, orientation member 22a itself may be able to adjust its course by means of its own control loops, on the basis of information from angle indicators, pressure transmitters, speed transmitters, depth gauges, positioning instruments and other instruments installed in orientation member 22a in order to provide as accurate positioning as possible.

FIG. 9 illustrates a front view, and FIG. 10 a cross-sectional view, of another orientation member 22b useful in the invention. Orientation member 22b is described in U.S. Pat. No. 3,605,674, and the following discussion summarizes the relevant portions of that patent. Orientation member 22b comprises a body 83 having a removable section 84 to allow body 83 to be secured about streamer 2. Removable section 84 may be secured to the remainder of the body by any suitable means such as screws 85, rivets, clips, and the like. In embodiment 22b of FIGS. 9 and 10, only one pair of vanes 86 is utilized. Accordingly, embodiment 22b will allow control of the orientation member and connected streamer only in a horizontal plane. Therefore, the system would also employ other orientation members that control the vertical position of the streamer, such as bird 22 described in reference to FIGS. 2 and 4-6. Vanes 86 are connected together by means of a yoke 87 that has a curved central section to allow passage of streamer 2. A ring 88 is fixedly secured to streamer 2 and mates with a recess 89 in body sections 83 and 84 to secure orientation member 22b at a desired and fixed position on streamer 2. When removable portion 84 is secured to body 83, recesses 89 are satisfactorily secured about ring portion 88 to prevent orientation member 22b from slipping longitudinally on streamer 2. Orientation member 22b can, however, rotate about streamer 2, and to maintain proper orientation of orientation member 22b relative to the water surface and sea bottom, a weight 90 may be secured at a suitable location in body 83. Weight 90 will insure that vanes 86, as well as the second pair of vanes in embodiments having horizontally disposed vanes (not illustrated) are maintained in the proper vertical and horizontal planes, so as to give full and accurate control over the orientation member. A bevel gear 91 is connected to yoke 87 and a second bevel gear 92 is connected to a shaft of a reversible D.C., stepper motor 93. This motor 93 is again secured to body 83, and as one can readily tell, operation of motor 93 will cause gear 91 to rotate along with yoke 87 to which gear 91 is fixedly secured. It should be noted that yoke 87 is rotatably mounted in body 83 and has suitable bearing members 94 for this purpose. These bearing members also contain sealing members 95 to prevent the flow of water into the body, thereby possibly damaging the actuating elements of the orientation member.

Fixedly secured to D.C. motor 93 is a receiver 96, which may also be secured to body 83 if desired. Receiver 96 may contain a power source for motor 93 such as a battery. The purpose of receiver 96 is to receive signals transmitted from a transmitter 99 carried by streamer 2 (a transmitter being positioned at each orientation member of this type) to actuate motor 93 accordingly. Appropriate wiring 98 leads through streamer 2 to carry signals from the vessel to transmitters 99. By proper signals, motor 93 may be actuated in either direction, thereby rotating vanes 86 in either direction.

Should streamers for some reason move out of position, appropriate signals can be transmitted to receivers 96 which will actuate motors 93 accordingly in respective orientation members of this type. The change in vane position is achieved, therefore, by supplying D.C. current in one direction or the other for a specific amount of time. A change in the direction of current flow will, of course, reverse the direction of rotation of the motor shaft and thereby, provide the means to rotate the vanes in either direction. Time of D.C. current flow is convertible into degrees of vane angle change and the operator may make up charts of such for ease of reference, or the process may be automated. Where a stepper motor is used, each electrical signal or pulse transmitted to the receiver will result in the rotation of the motor shaft through a discrete increment, for example, twelve degrees. With this knowledge and with knowledge of the gear ratio used, the amount of vane rotation for a pulse or a train of pulses can be determined. The change in position of the vanes will bring about the necessary adjustment to the path of travel of the orientation members. Once the proper position has been resumed, the vanes can be again adjusted to the neutral position of FIG. 9 so that the streamer will continue along in the path desired.

In the situation such as passing through an area of crosscurrents, the vanes can be rotated into the necessary position to maintain the streamer on line with the desired path of travel through this area. Once the area of crosscurrents has been passed, the vanes may again return to their neutral position shown in FIG. 9. All of the previously discussed adjustments can be made manually or with the provision of proper equipment, automatically, for example though use of a control scheme such as that illustrated in FIG. 3 and discussed herein above.

As will be understood by those skilled in this art, streamers 2 and 2' may include weights (not shown) to provide a ballast effect, thus giving each streamer a neutral balance at the desired depth, or as nearly as possible, thus, the streamers will tend to sink to, and remain at, their desired depths. There are situations, however, in which it would be desirable to be able to adjust the depth of the orientation members, or more accurately, adjust the distance between the orientation members and streamers, and/or between the lower streamer and the bottom of the body of water in the case of over/under configurations. For this purpose, orientation members 22b' (not illustrated) utilizing two pairs of vanes may be used. Again a weight 90 (see FIG. 10) is employed to insure that proper orientation of the orientation member 22b' is maintained so that movement of the control vanes will bring about the desired changes in direction or depth. The operation of this last discussed embodiment 22b' is in effect the same as with embodiment 22b, with the exception that it provides means to control the position of a streamer in both the vertical and horizontal planes, indeed in 3-dimensions.

FIGS. 11 and 12 are a front and a sectioned diagrammatic side profile view, respectively, of another orientation member 22c useful in the present invention. Split collars 211 are fixedly attached to streamer 2 where it is desired to mount orientation member 22c. Each collar contains a channel that accepts a concentric ring 212. Each ring 212 is split for mounting around collar 211 and is locked by appropriate means after mounting. Once locked, each ring 212 is free to rotate within the channel of its collar 211. Mounting brackets 213 and 214 are fixedly secured by suitable means to each ring 212. Each mounting bracket 213 and 214 accepts a first tube 202 and second tube 203. Mounting brackets 213 and 214 secure each tube 202 and 203 along a diametric axis 210 of streamer 2. First tube 202 may contain the receiver means, decoder means, actuator means and motor means. Second tube 203 may contain a plurality of batteries which provide power through appropriate wiring 215 to the motor means and electrical components of the first tube 202. Mounting bracket 213 is also suitably formed to accept a pair of diametrically opposed collinear shafts 204 of a yoke 87 having a curved central section 216 to allow the passage of streamer 2. Fixedly attached to each shaft 204 is a pair of vertically oriented control surfaces or fins 86. As only vertically oriented fins 86 are provided in this embodiment, the device 22c may only be used for controlling the location of streamer 2 in the horizontal plane. Each ring 212 allows a free rotation of each bracket 213 and 214 with mounted tubes 202 and 203 and yoke 87 as streamer 2 twists. The weight of tubes 202 and 203 will maintain orientation member 22c in the proper vertical orientation. If desired, buoyancy means 218 may be provided to assist in maintaining orientation member 22c in the vertical orientation and also to provide neutral buoyancy.

Yoke 87 and connected fins 86 may be rotated by motor means within tube 202. A first beveled gear 216 is attached to a shaft 217 from a reversible DC stepper motor within first tube 202. A suitable bearing and sealing member (not depicted) is provided in an end of tube 202 for passage and rotation of shaft 217 while preventing the entry of water. A second beveled gear 219 is fixedly secured to shaft 204 of yoke 87. As can be seen, operation of the motor will cause gears 216 and 219 to rotate along with yoke 87 to which gear 219 is fixedly secured. Mounting brackets 213 and 214 may also be provided with suitable bearing members 220 for rotatable mounting of yoke 87. If desired, a streamlined fairing 222 (depicted in phantom in FIG. 12) made of fiberglass or other suitable material may be provided to further streamline orientation member 22c. It is envisioned that fairing 222 may be provided in two halves 84 and 84' that are fixedly secured to one another and around streamer 2 by suitable means such as screws 85, rivets, clamps, and the like. Tubes 202 and 203 may provide protection for their contained components so it is unnecessary to seal fairing 222, if provided. Induction means may be located in first tube 202 and sense the encoded control signals transmitted along wires by a transmission means (not illustrated).

Orientation members useful in the invention may connect to at least one streamer in such a way that it is able to communicate with the outside world, which may be a vessel, satellite, or land-based device. The way this may be accomplished varies in accordance with the amount of energy the orientation members require and the amount of energy they may be able to store locally in terms of batteries, fuel cells, and the like. If the local storage capacity for batteries, fuels cells, and the like is sufficient, orientation members may be clamped onto the streamer skin at locations where there is located an inductor inside the streamer skin. Then any particular orientation member and its streamer can communicate through the skin with electrical impulses. If, on the other hand, an orientation member needs charging power from the streamer a different approach is required. In this case the orientation member may be mounted between two streamer sections and as such comprise an insert between two streamer sections, as described herein.

It is within the invention to combine systems of the invention with other position control equipment, such as source array deflecting members, and streamer deflectors. Some of these may include bridle systems, pneumatic systems, hydraulic systems, and combinations thereof.

As mentioned herein, materials of construction of orientation members and streamers useful in systems and methods of the invention may vary. However, there may be a need to balance the seismic equipment so that the system is balanced to be neutrally buoyant in the water, or nearly so, to perform its intended function. Polymeric composites, with appropriate fillers used to adjust buoyancy and mechanical properties as desired, may be employed.

In use the position of a pair of streamers may be actively controlled by GPS or other position detector sensing the position of the streamer pair, and tilt sensors, acoustic sensors, or other means may sense the orientation of one or more individual streamers and feed this data to navigation and control systems. The positions of GPS nodes could be measured while the streamer shape may be calculated using a simulation and optionally current direction and magnitude measurements. Or all streamer positions could be determined by simulation only. Alternatively, data may be fed-forward to local controllers on one, some, or all orientation members. Gross positioning and local movement of the streamer pair may be controlled on board a tow vessel, on some other vessel, locally, or indeed a remote location. By using a communication system, either hardwire or wireless, information from the remote controller may be sent to one or more local controllers on orientation members, and, when present and when desired, one or more deflecting members or streamer deflectors. The local controllers in turn are operatively connected to adjustment mechanisms comprising motors or other motive power means, and actuators and couplers connected to the orientation members, and, if present, deflectors, which function to move the streamers as desired. This in turn adjusts the position of the streamer pair, causing it to move as desired. Feedback control may be achieved using local sensors positioned as appropriate depending on the specific embodiment used, which may inform the local and remote controllers of the position of one or more orientation members, the tilt angle of a pair of streamers, distance between streamer pairs, a position of an actuator, the status of a motor or hydraulic cylinder, the status of a bird, and the like. A computer or human operator can thus access information and control the entire positioning effort, and thus obtain much better control over the seismic data acquisition process.

Very often, water currents vary significantly with depth and two or more streamers in an over/under configuration are easily brought out of the ideal depth and lateral position, or the streamers may "snake" or "feather." To correct for these movements, orientation members useful in systems of the invention may enforce vertical and/or lateral movement of such streamers. For example, rotational movement may be accomplished by moving wings 34 of two particular orientation members 22, say one each on streamer 2 and 2', in opposing directions, and translation force may be imposed by positioning wings 34 in identical directions. A combination of these movements may also be imposed.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures. Thus, although a clamp-on bird and an inline bird may not be structural equivalents in that a clamp-on bird employs one type of fastener, whereas an inline bird employs a different fastener, in the environment of using birds to position streamers, a clamp-on bird and an inline bird may be equivalent structures.

What is claimed is:

1. A system comprising:
   (a) a first seismic streamer having a first portion at a first vertical position and having a first orientation member;
   (b) a second seismic streamer having a second portion at a second vertical position different from the first vertical position and having a second orientation member;
   (c) the orientation members functioning to control vertical and horizontal position of at least the first and second portions in over/under configuration,
   (d) a control system allowing the first and second orientation members to send signals to and receive signals from each other.

2. The system of claim 1 wherein the first orientation member comprises first control surfaces.

3. The system of claim 2 wherein the second orientation member comprises second control surfaces.

4. The system of claim 3 wherein the first and second control surfaces are adapted to be controlled independently.

5. The system of claim 1 wherein the first orientation member comprises a first plurality of remotely controllable birds, at least some of which are able to control vertical position and at least some of which are able to control horizontal position of the first streamer.

6. The system of claim 5 wherein the second orientation member comprises a second plurality of remotely controllable birds, at least some of which are able to control vertical position and at least some of which are able to control horizontal position of the second streamer.

7. The system of claim 6 wherein each bird of the first plurality of remotely controllable birds is positioned near a corresponding bird of the second plurality of remotely controllable birds.

8. The system of claim 7 wherein all the remotely controllable birds are adapted to control both vertical and horizontal position of the first and second seismic streamers.

9. The system of claim 1 where in all the orientation members are adapted to control both vertical and horizontal position of the first and second seismic streamers.

10. The system of claim 1 wherein the first orientation member comprises a first portion of orientation members that control only vertical position of the first seismic streamer and a second portion of orientation members that control only horizontal position, and the second orientation member controls both vertical and horizontal position of the second seismic streamer.

11. The system of claim 1 including features selected from:
   a) a control system allowing each orientation member to send signals to and receive signals from a remote controller;
   b) the first seismic streamer comprises a third portion having a third vertical position different from the first and second vertical positions;
   c) the second seismic streamer comprises a fourth portion having a fourth vertical position different from the first, second and third vertical positions;
   d) a third streamer having a third portion at a third vertical position, wherein the third streamer has a horizontal offset ranging from zero to some non-zero value with respect to the first and second streamers;
   e) and combinations thereof.

12. A method comprising:
   (a) releasably attaching a first orientation member to a seismic streamer and a second orientation member to a second seismic streamer, the first seismic streamer having a first portion at a first vertical position, the second seismic streamer having a second portion at a second vertical position different from the first vertical position; and
   (b) adjusting the orientation members to control vertical and horizontal position of at least the first and second portions in over/under configuration, wherein the first and second orientation members send signals to and receive signals from each other.

13. The method of claim 12 wherein the adjusting is performed by communicating with the orientation members.

14. The method of claim 13 wherein the adjusting comprises transmitting signals to one or more remotely controllable orientation members mounted inline in the first and second seismic streamers.

15. The method of claim 12 wherein the adjusting is selected from:
   a) transmitting signals to one or more remotely controllable orientation members mounted on the first and second seismic streamers;
   b) moving the first seismic streamer so it is positioned at a shallower depth than the second seismic streamer;
   c) signaling a third orientation member to move a third portion of the first seismic streamer to a vertical position different from the first and second vertical positions;
   d) signaling the first and second orientation members to move the first and second seismic streamers as a first pair in relation to a second pair of seismic streamers;
   e) signaling the first and second orientation members to move the first and second seismic streamers as a first pair in relation to a natural or man-made reference;
   f) signaling the first and second orientation members to move the first and second seismic streamers into a regular cross-line pattern; and
   g) combinations thereof.

16. The method of claim 12 wherein the adjusting comprises signaling the first and second orientation members to move the first and second seismic streamers to repeat a streamer configuration used previously.

17. The method of claim 12 wherein the adjusting comprises signaling the first orientation member to move vertically only and signaling the second orientation member to move both vertically and horizontally, or vice versa.

18. The method of claim 12 wherein the adjusting comprises signaling the first and second orientation members to vary a distance between the first portion of the first seismic streamer and the second portion of the second seismic streamer.

19. A system comprising:
   (a) an array of seismic streamers arranged in an over/under configuration; and
   (b) a plurality of orientation members to control vertical and horizontal position of the seismic streamers, the plurality of orientation members attached to at least some of the seismic streamers, wherein the orientation members attached to the seismic streamers that are in the over/under configuration are configured to send signals to and receive signals from each other.

20. A method comprising:
   (a) towing an array of seismic streamers in over/under configuration; and
   (b) controlling vertical and horizontal position of the seismic streamers by adjusting orientation members attached to the seismic streamers, wherein the orientation attached to the seismic streamers in the over/under configuration are configured to send signals to and receive signals from each other.

* * * * *